United States Patent [19]

Steigerwald et al.

[11] Patent Number: 5,274,539
[45] Date of Patent: Dec. 28, 1993

[54] CAPACITANCE-MULTIPLYING CONVERTERS FOR SUPPLYING DISTRIBUTED PULSED LOADS

[75] Inventors: Robert L. Steigerwald, Burnt Hills; Rayette A. Fisher, Schenectady, both of N.Y.

[73] Assignee: General Electric Company, Schenectady, N.Y.

[21] Appl. No.: 802,102

[22] Filed: Dec. 4, 1991

[51] Int. Cl.[5] .......................................... H02M 3/335
[52] U.S. Cl. ........................................ 363/20; 363/65; 363/71; 363/127; 363/131
[58] Field of Search ................. 363/20, 65, 71, 127, 363/131

[56] References Cited

U.S. PATENT DOCUMENTS

| | | | |
|---|---|---|---|
| 4,356,541 | 10/1982 | Ikenoue et al. | 363/20 |
| 4,519,024 | 5/1985 | Federico et al. | 363/127 |
| 4,763,237 | 8/1988 | Wieczorek | 363/20 |
| 4,809,149 | 2/1989 | Burghard | 363/131 |
| 4,814,963 | 3/1989 | Petersen | 363/71 |
| 4,870,555 | 9/1989 | White | 363/127 |
| 5,019,545 | 5/1991 | Bourgeault et al. | 363/71 |
| 5,107,411 | 4/1992 | Misdom | 363/131 |

OTHER PUBLICATIONS

L. F. Casey and M. F. Schlect, "A High Frequency, Low Volume, Point-Of-Load Power Supply for Distributed Power Systems", Proceedings of the IEEE Power Electronics Specialists Conference, Dec. 1987, pp. 439-450.

Primary Examiner—Jeffrey Sterrett
Attorney, Agent, or Firm—Jill M. Breedlove; Marvin Snyder

[57] ABSTRACT

A distributed power system for supplying pulsed loads, such as radar loads, includes a relatively high-voltage, energy-storage capacitor coupled in parallel between an input dc power source and a capacitance-multiplying converter. The pulse energy is stored in the energy-storage capacitor and is coupled to the load via low-leakage inductance transformer action. As a result, the size of the energy-storage capacitor is reduced, while maintaining a high bandwidth for supplying fast-rising pulsed loads.

11 Claims, 10 Drawing Sheets $V_{Qa}$ $V_{Qb}$ $V_{Qa} - V_{Qb}$ $V_{gateSRa}$ $V_{gateSRa}$

EQUAL AREAS $V_{gateSRa}$

EQUAL AREAS

CAPACITANCE-MULTIPLYING CONVERTERS FOR SUPPLYING DISTRIBUTED PULSED LOADS

FIELD OF THE INVENTION

The present invention relates generally to power systems for supplying pulsed loads. More particularly, the present invention relates to a high-density distributed power system employing capacitance-multiplying converters for supplying pulsed loads, such as radar loads.

BACKGROUND OF THE INVENTION

Power to pulsed loads, such as radar loads, is typically supplied by a power converter that provides current to an energy-storage capacitor coupled in parallel with the load. The power converter is thus rated for average power, while the energy-storage capacitor supplies the peak pulse power to the load. Disadvantageously, the energy-storage capacitor is at the relatively low load voltage (e.g., typically 6 to 9 volts for radar) and is therefore large. Hence, it is desirable to store the pulse energy at relatively high voltage and thereby reduce the size of the energy-storage capacitor, while maintaining a high bandwidth for supplying fast-rising pulsed loads. Furthermore, it is desirable to supply the required peak power from the energy-storage capacitor(s) so that the input power source is not burdened with high peak power pulses and thus only has to supply average power. Still further, it is desirable to reduce electromagnetic interference and switching losses.

SUMMARY OF THE INVENTION

A power system for supplying pulsed loads, such as, for example, radar loads, comprises a relatively high-voltage, energy-storage capacitor $C_e$ coupled in parallel between an input dc power source and a capacitance-multiplying converter. The capacitance-multiplying converter includes a series combination of a first switching device and a primary winding of a first transformer coupled in parallel with the energy-storage capacitor and further includes a series combination of a second switching device and a primary winding of a second transformer coupled in parallel with the energy-storage capacitor. A secondary winding of each of the first and second transformers are coupled, via separate respective rectifying means, in parallel with a relatively low-voltage output filter capacitor. The first and second transformers each have substantially the same turns ratio N, where $$N = \frac{N_{primary}}{N_{secondary}},$$

$N_{primary}$ being the number of primary turns and $N_{secondary}$ being the number of secondary turns, so that the effective equivalent output capacitance $C_{eo}$ is represented as:

$$C_{eo} = N^2 C_e.$$

Hence, since the energy-storage capacitance $C_e$ is multiplied by the square of the turns ratio N, the value and size of energy-storage capacitor $C_e$ is substantially reduced for substantially the same amount of stored energy. Furthermore, the equivalent series resistance of the energy-storage capacitor as viewed from the load is also reduced by the factor $N^2$, thereby reducing the initial voltage drop when the pulsed load is first applied. Similarly, the equivalent series inductance of the energy-storage capacitor is also reduced, thereby increasing the rise time of the output energy pulse. The result is a relatively small, lightweight, efficient pulsed power converter system operating at a relatively high bandwidth.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
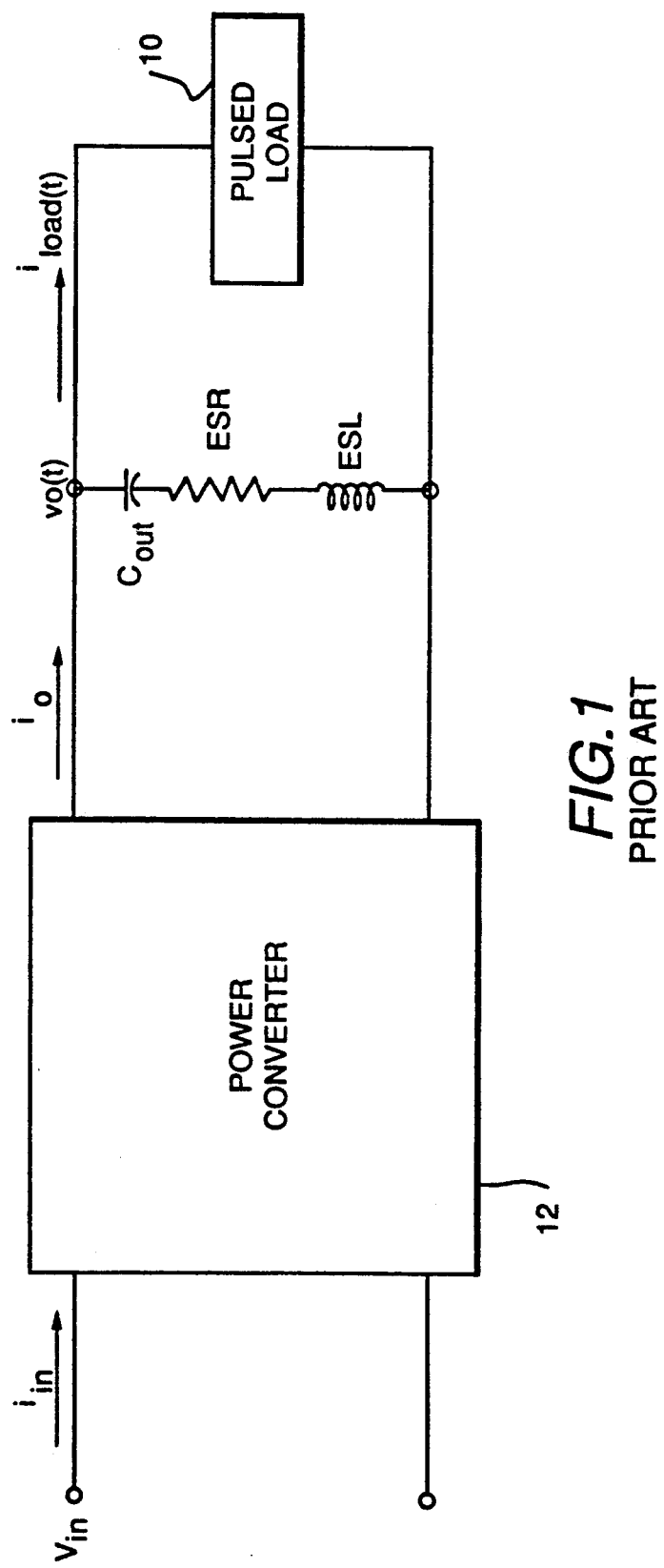
FIG. 1 schematically illustrates a conventional power system for supplying a pulsed load.
Figure 2:
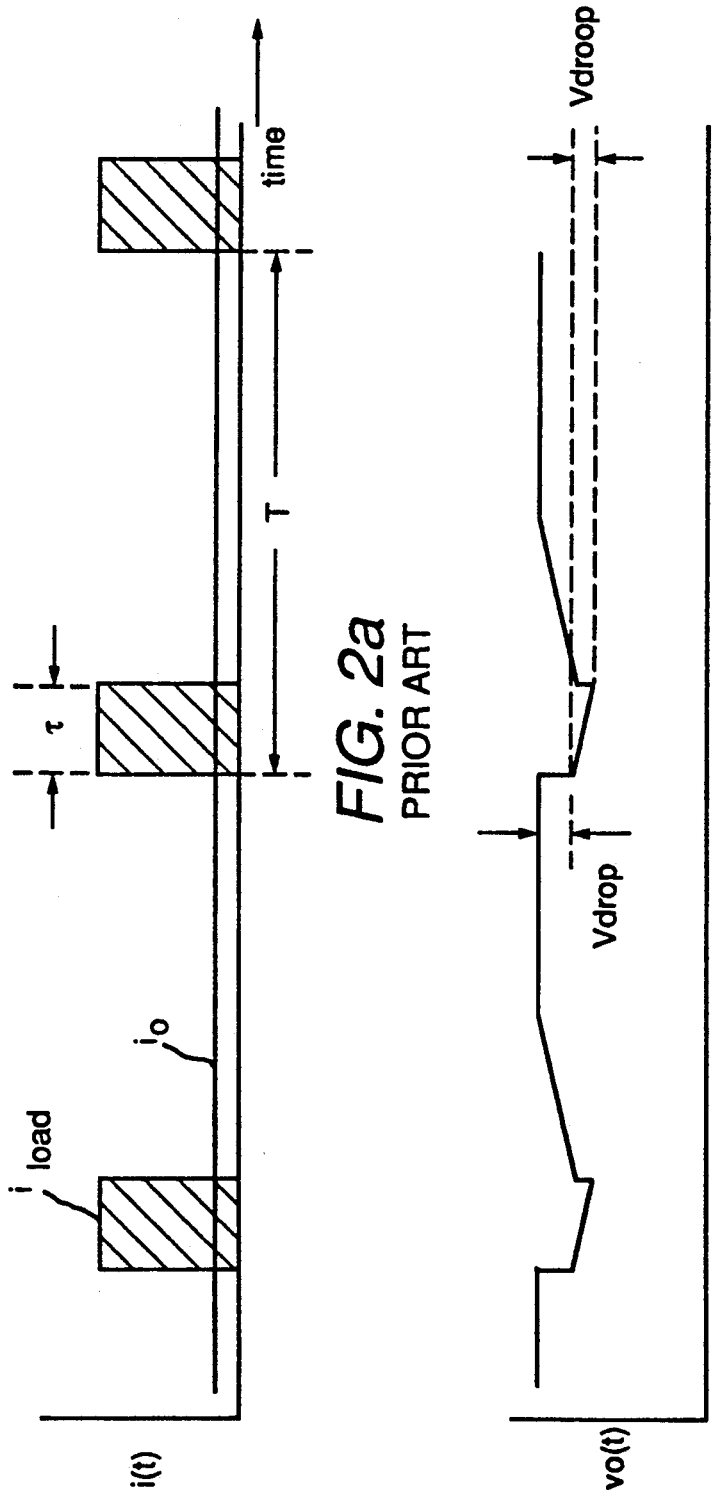
FIG. 2a graphically illustrates the average and load currents for the conventional power system of FIG. 1.
FIG. 2b graphically illustrates the load voltage for the conventional power system of FIG. 1.

FIG. 1 illustrates a conventional power system for supplying a pulsed load 10. As shown, a power converter 12 receives a dc voltage $V_{in}$ from an input dc power source (not shown). An energy-storage capacitor $C_{out}$, having an equivalent series resistance ESR and an equivalent series inductance ESL associated therewith, is coupled in parallel with pulsed load 10. The load voltage is represented by $v_o$, and the load current is represented by $i_{load}$. The power converter receives an input current $i_n$ and supplies average current $i_o$ to energy-storage capacitor $C_{out}$ and the load. For the system of FIG. 1, the power converter need only be rated for average power, while the energy-storage capacitor supplies the peak pulse power (i.e., the difference between the peak load power and the average power) to the load, as illustrated in the waveforms of FIG. 2. In FIG. 2a, $\tau$ represents the pulse width, and T represents the period of the load current waveform. In FIG. 2b, $V_{drop}$ represents the initial voltage drop due to the pulse current in ESR when the pulsed load is initially applied, and $V_{droop}$ represents the voltage droop due to the discharging of energy-storage capacitor $C_{out}$.

Figure 3:
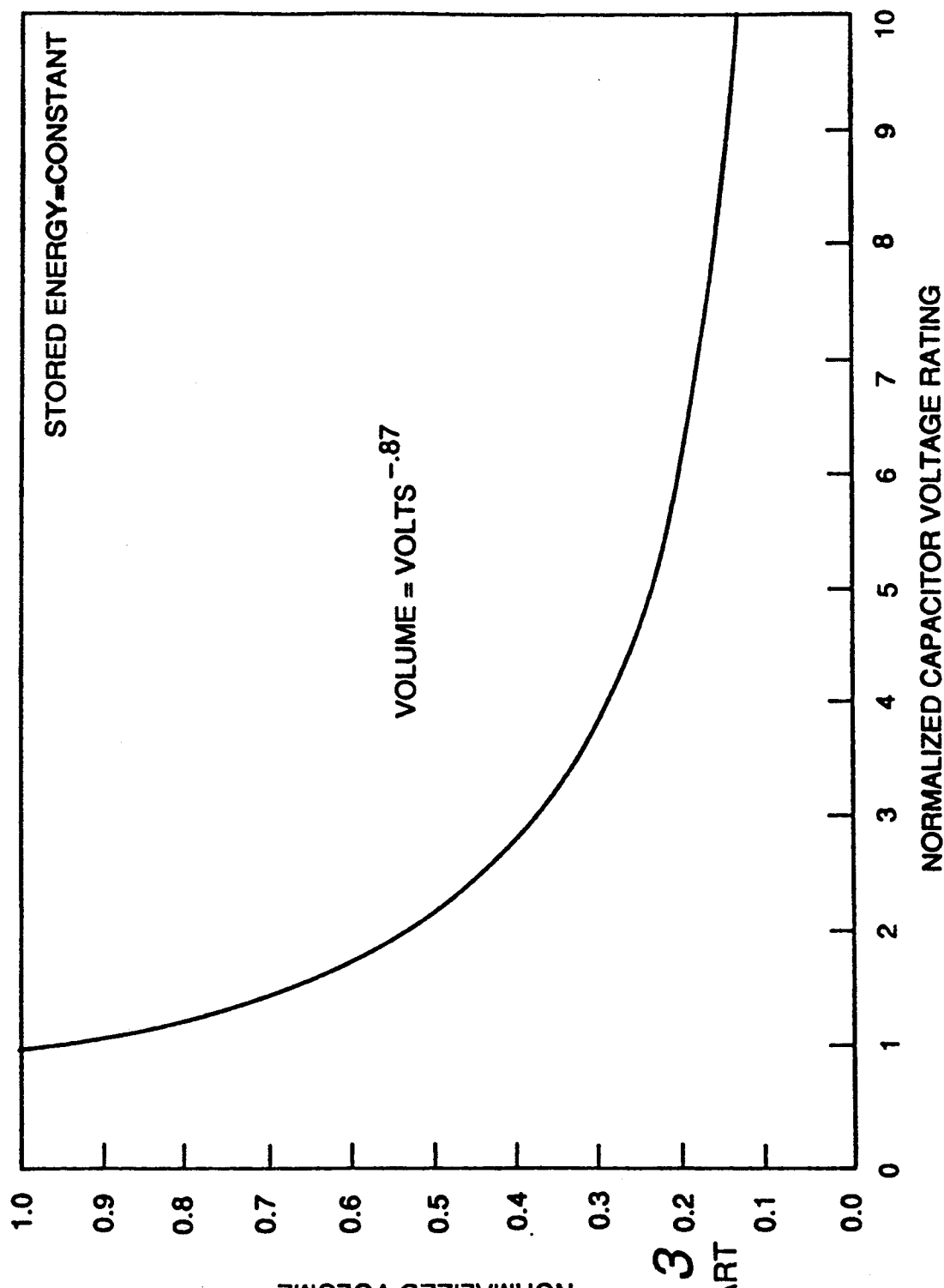
FIG. 3 graphically illustrates energy-storage capacitor size versus voltage rating for a power system supplying pulsed loads.

Disadvantageously, in the conventional system of FIG. 1, energy-storage capacitor $C_{out}$ is at the relatively low load voltage (e.g., typically 6 to 9 volts for a solid-state radar load) and is therefore large. FIG. 3 shows the relationship between capacitor voltage rating and the size of the capacitor needed to store a given amount of energy. (The graph of FIG. 3 was obtained empirically from available energy-storage capacitor data.) However, according to the present invention, a power system is provided which is capable of storing energy at high voltage, thus reducing the size of the energy-storage capacitor, while maintaining a relatively high bandwidth for supplying fast-rising pulsed loads.

Figure 4:
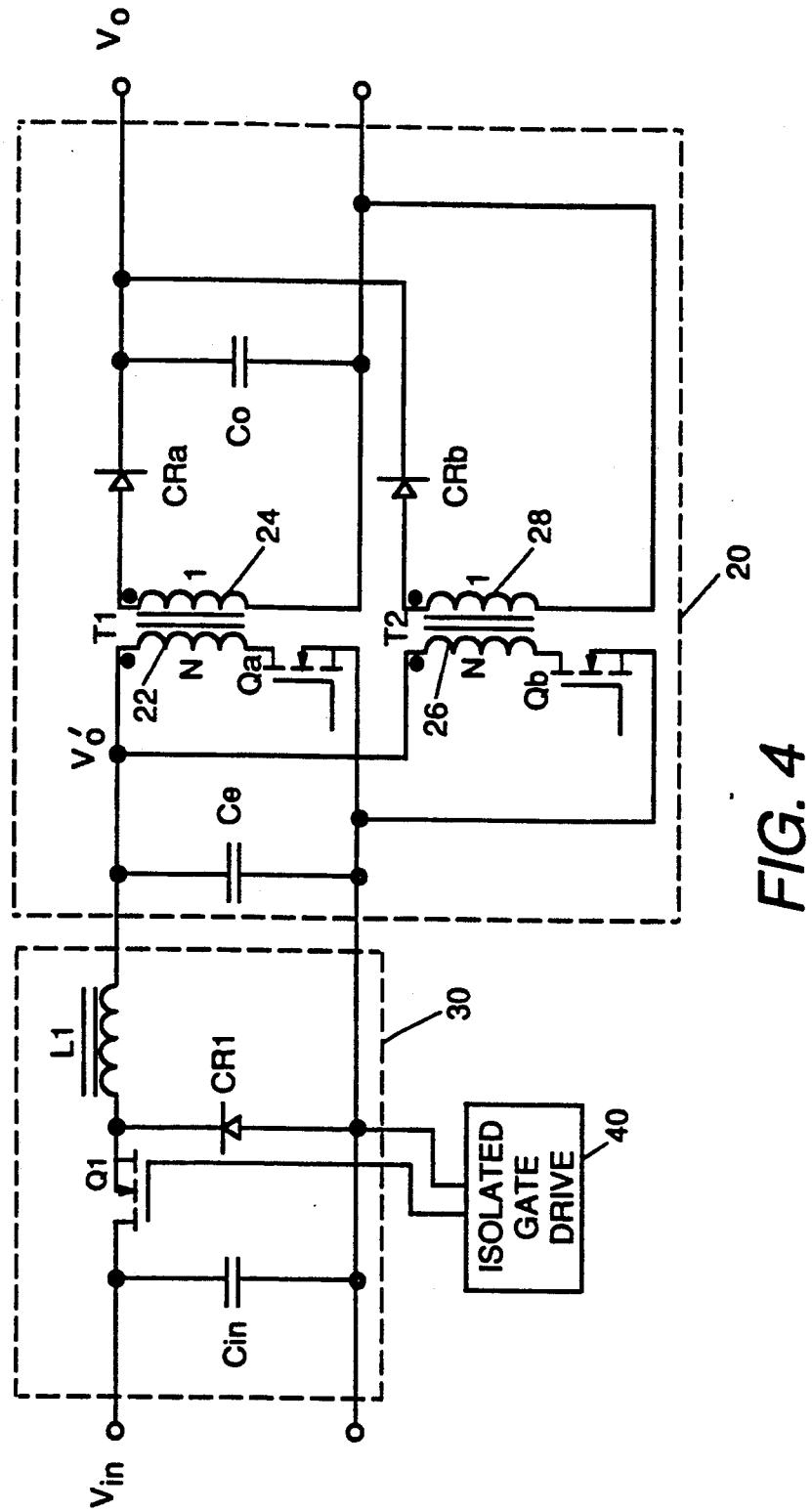
FIG. 4 schematically illustrates a power system employing a capacitance-multiplying converter for supplying pulsed loads according to the present invention.

FIG. 4 illustrates a power system employing a capacitance-multiplying converter 20 in accordance with the present invention. Capacitance-multiplying converter 20 includes a series combination of a first switching device Qa and a primary winding 22 of a first transformer T1 coupled in parallel with an energy-storage capacitor $C_e$. A secondary winding 24 of transformer T1 is coupled in parallel, via a diode rectifier CRa, to a small high-frequency output filter capacitor Co. Capacitance-multiplying converter 20 further includes a series combination of a second switching device Qb and a primary winding 26 of a second transformer T2 also coupled in parallel with energy-storage capacitor Ce. A secondary winding 28 of transformer T2 is coupled in parallel, via a diode rectifier CRb, to output filter capacitor Co. Transformers T1 and T2 have substantially the same turns ratio N. Switching devices Qa and Qb are illustrated as FET's; however, any suitable types of switching devices may be used.

In operation, switching devices Qa and Qb are gated 180° out-of-phase with a 50% duty cycle. Hence, because one of the switching devices is always conducting, the energy-storage capacitor Ce is always transformer-coupled to the dc output through either the combination of transformer T1 and rectifier CRa or the combination of transformer T2 and rectifier CRb.

The output filter capacitor Co is used for filtering switching noise and hence is not required to store substantial energy. Output filter capacitor Co is thus relatively small as compared with energy-storage capacitor Ce. Therefore, through transformer action, the effective output capacitance $C_{eo}$ is represented by:

$$C_{eo}=N^2 C_e.$$

For an exemplary radar system, the energy-storage capacitor Ce is at 100 or more volts, and the output filter capacitor $C_o$ is at 5 to 9 volts. For this example, the transformer turns ratio N is 10:1 or greater. Hence, the energy-storage capacitance is multiplied by at least approximately 100. In addition, the energy is stored at a higher voltage so that the energy-storage capacitor is smaller for the same amount of stored energy. Furthermore, the equivalent series resistance (ESR) of the energy-storage capacitor as viewed from the load is also reduced by $N^2$, which is substantially lower than that achieved by conventional energy-storage techniques. As a result, the initial voltage drop ($V_{drop}$ of FIG. 2b) when the pulsed load is first applied is reduced. Similarly, the ESL of the energy-storage capacitor Ce is reduced by $N^2$, thereby increasing the rise time of the output energy pulse.

The leakage inductance of each of transformers T1 and T2 is preferably as low as possible because such leakage inductance, which appears as an equivalent series inductance (not shown) on the transformer secondary side, is an impedance to the relatively higher frequency currents generated in the transformers by the converter, causing an equivalent dc voltage drop after rectification at the output. One way to achieve a low leakage inductance is to use interleaved windings.

As shown in FIG. 4, a pre-regulator circuit 30 is preferably used to regulate the output dc voltage Vo. Pre-regulator circuit 30 is shown as comprising a well-known buck-type regulator; however, any suitable pre-regulator circuit may be used. Pre-regulator circuit 30 includes: an input filter capacitor Cin coupled in parallel with the dc source voltage Vin; a switching device Q1 coupled between the high-voltage terminal of filter capacitor Cin and the cathode of a diode CR1, the anode of diode CR1 being coupled to the ground terminal of the dc source; and a filter inductor L1 coupled in series between the cathode of diode CR1 and the high-voltage terminal of energy-storage capacitor Ce. Pre-regulator circuit 30 is controlled in a well-known fashion to regulate the output dc voltage. For relatively tightly coupled transformers T1 and T2, a suitable regulation scheme involves regulating the voltage Vo' on the primary side with the result that the output voltage Vo tracks closely. However, for more demanding regulation requirements, the output voltage vo may be fed back directly to the gate drive 40 for switching device Q1 in order to directly regulate the output voltage Vo.

Figure 5:
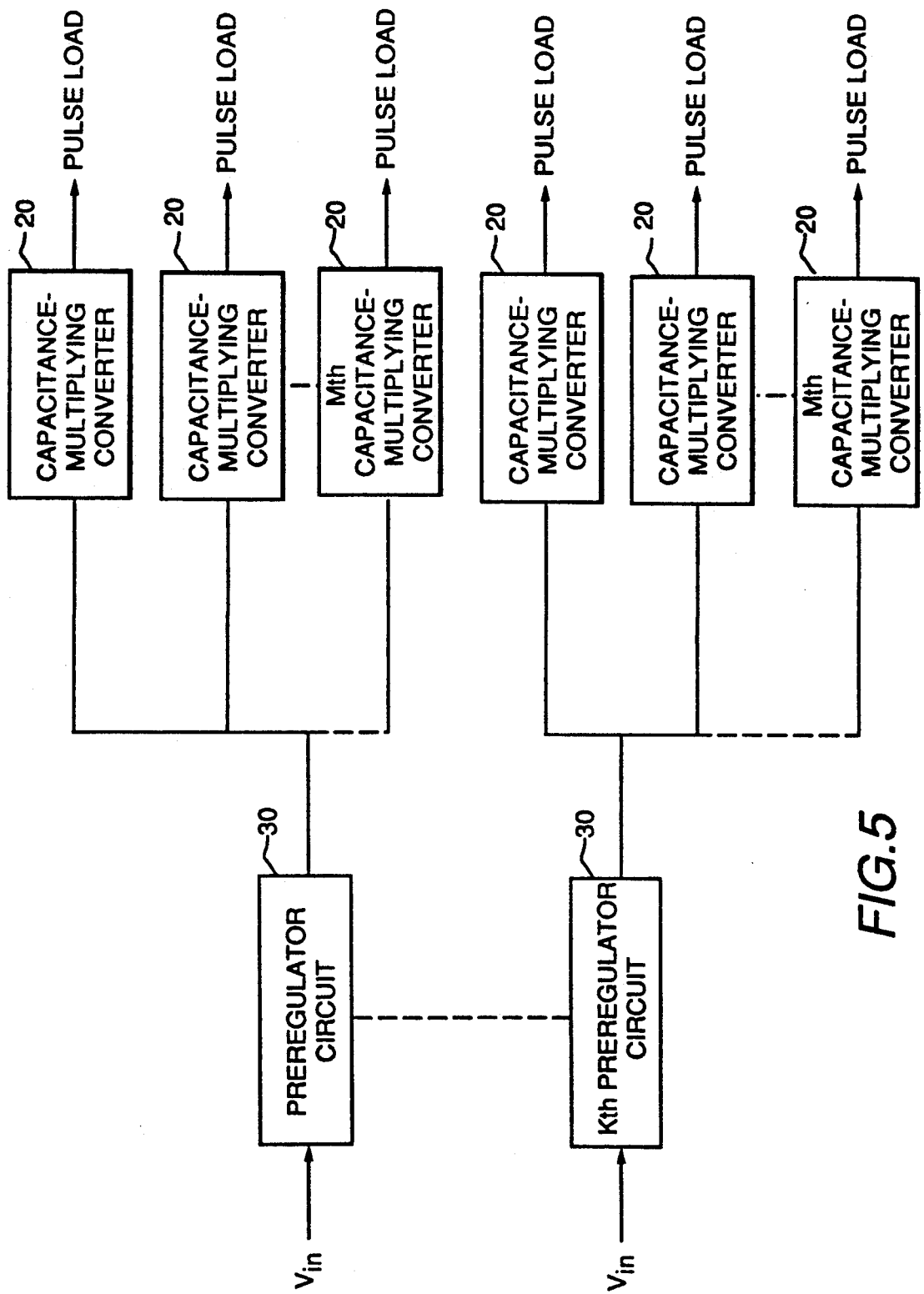
FIG. 5 illustrates a distributed power system according to one embodiment of the present invention.

Although each capacitance-multiplying converter in a distributed power system may be driven by a separate respective pre-regulator, a single pre-regulator may be employed to drive several capacitance-multiplying converters, if desired. For example, FIG. 5 illustrates such a power system wherein a number K of pre-regulator circuits 30 are employed, each respective pre-regulator circuit 30 driving a number M of capacitance-multiplying converters 20.

Preferably, the output parasitic capacitance of switching devices Qa and Qb are resonated with the respective transformer magnetizing inductance T1 and T2 so that zero-voltage switching occurs. In this way, the switching devices can be operated at high frequencies to reduce the required sizes of inductive and capacitive circuit components. Zero-voltage switching is described by L. F. Casey and M. F. Schlect in "A High Frequency, Low Volume, Point-of-Load Power Supply for Distributed Power Systems", *Proceedings of the IEEE Power Electronics Specialists Conference*, 1987, pp. 439–450, which is incorporated by reference herein.

Figure 6:
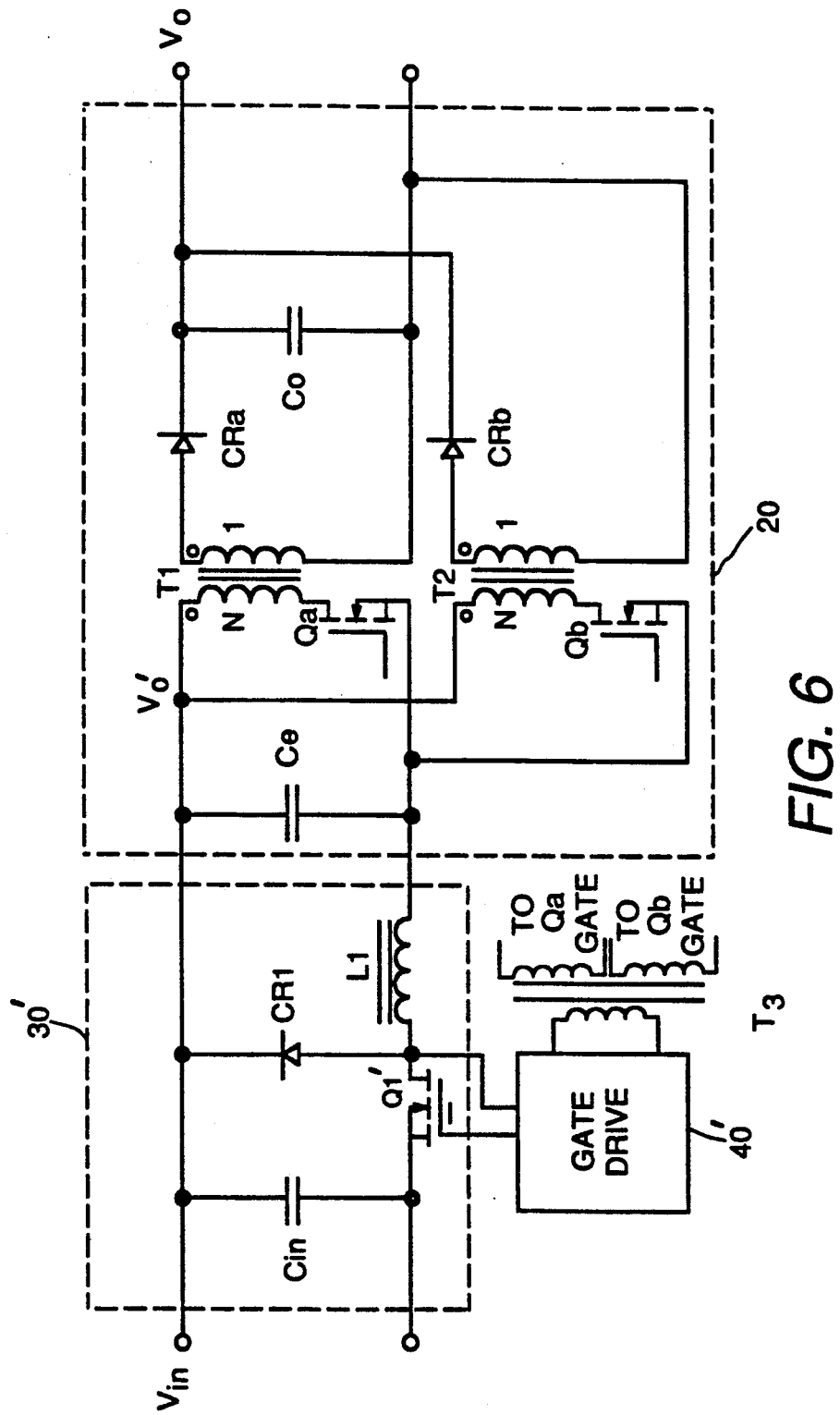
FIG. 6 schematically illustrates an alternative embodiment of the power system of FIG. 4.

In another preferred embodiment, as shown in FIG. 6, the source terminal of switching device Q1' of pre-regulator circuit 30' is coupled to ground potential, allowing a simple, non-isolated gate drive 40' to be used. In particular, the two switching devices Qa and Qb are easily driven with a pulse transformer T3 because they are gated at a substantially constant, substantially 50% duty cycle.

Figure 7:
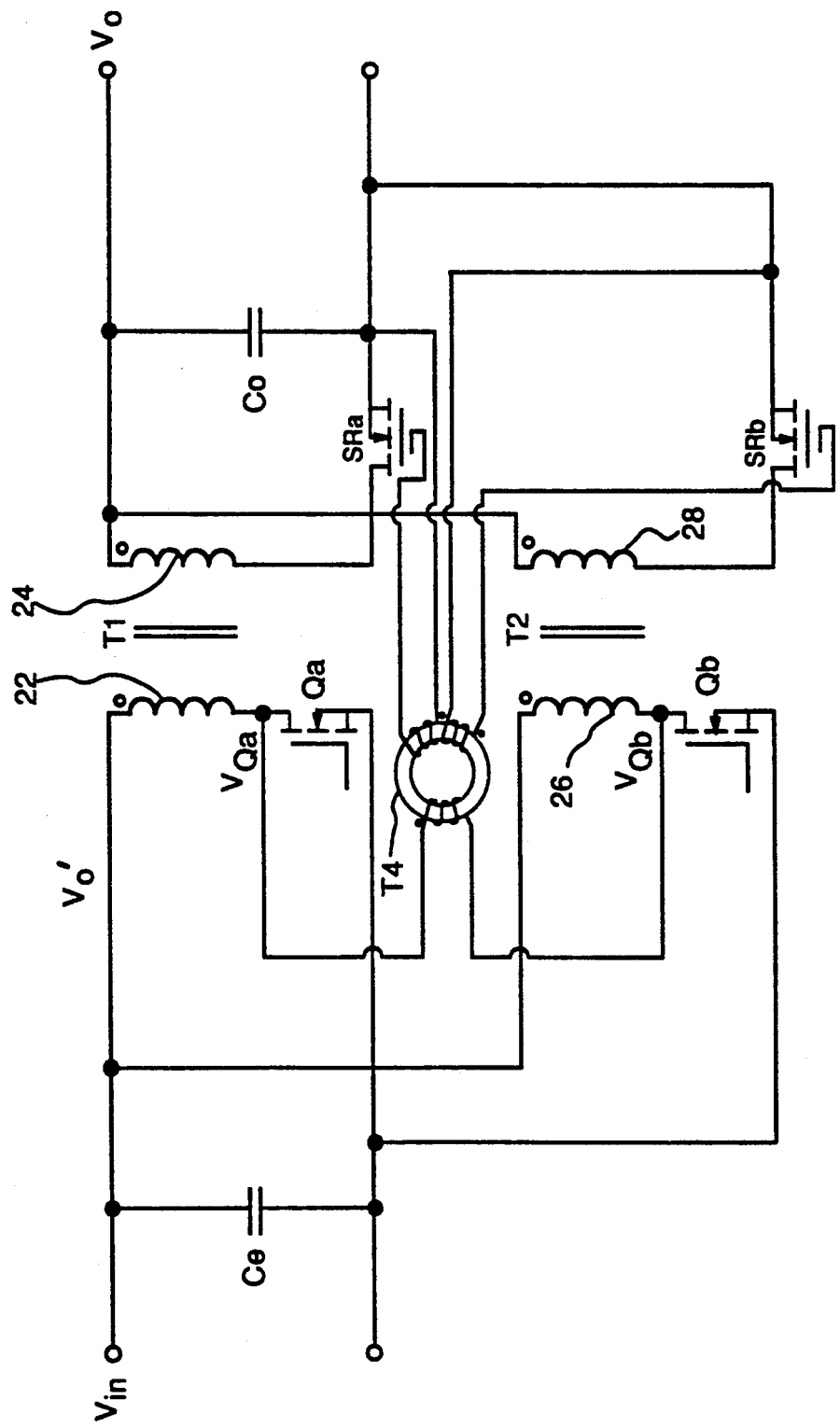
FIG. 7 schematically illustrates another alternative embodiment of the power system of the present invention.
Figure 8:
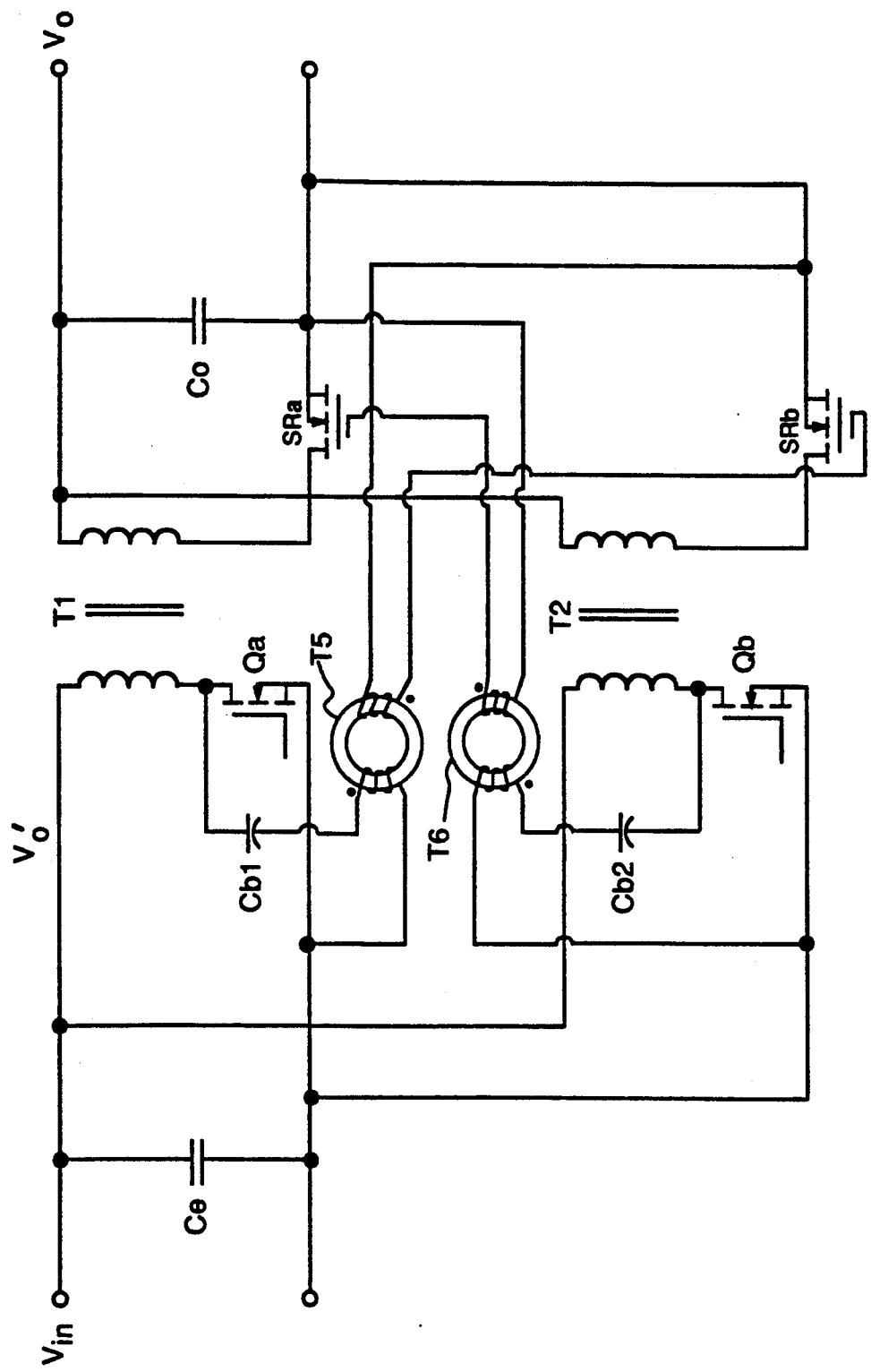
FIG. 8 schematically illustrates still another alternative embodiment of the power system of the present invention.
Figure 9:
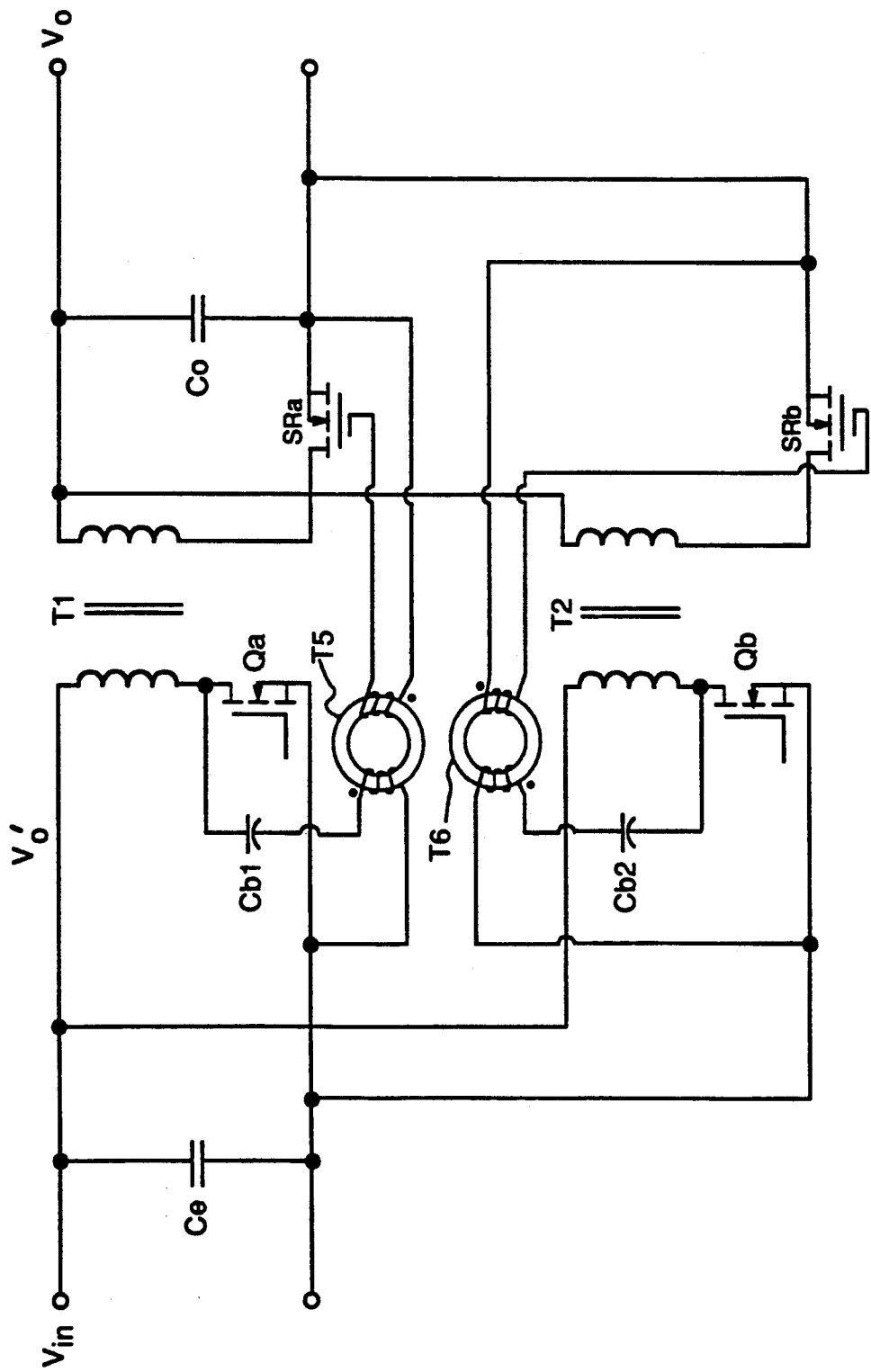
FIG. 9 schematically illustrates still another alternative embodiment of the power system of the present invention.
Figure 10A:
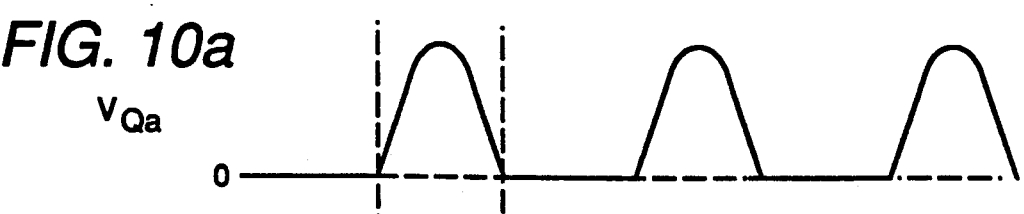
FIGS. 10a–10f graphically illustrates voltage waveforms useful in understanding operation of the power system of the present invention.
Figure 10B:
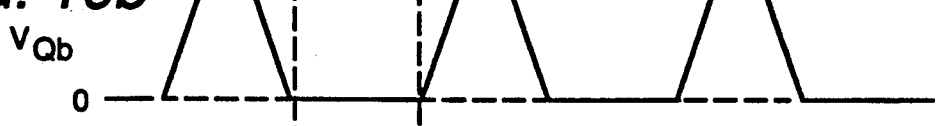
Figure 10C:
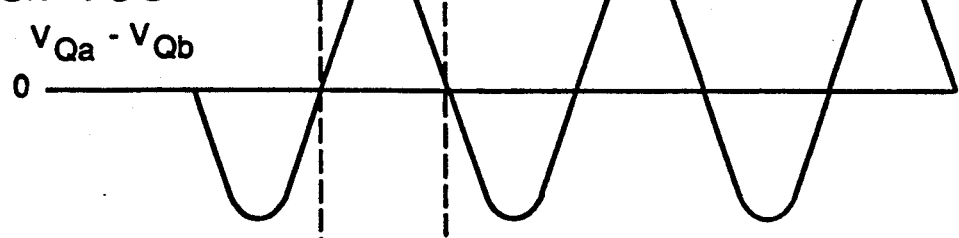
Figure 10D:
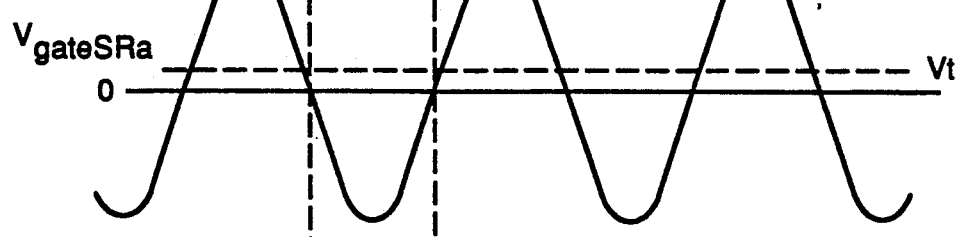
Figure 10E:
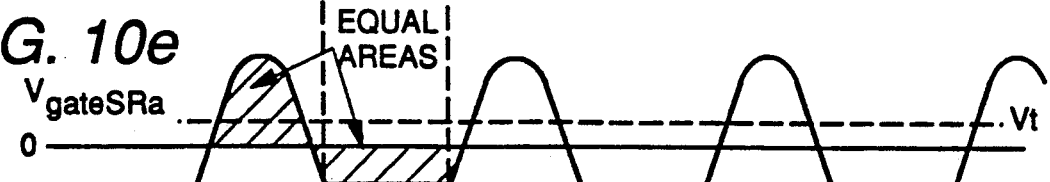
Figure 10F:
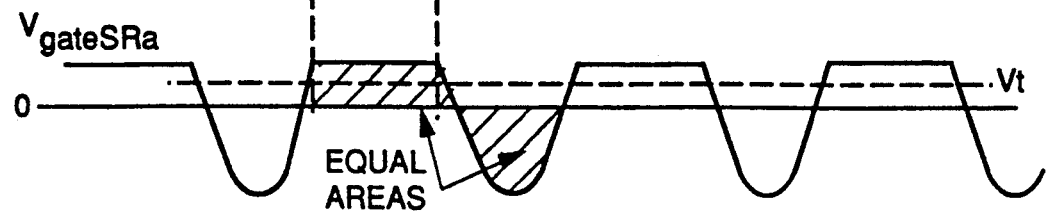

In other alternative embodiments, such as those of FIGS. 7–9, synchronous rectifiers SRa and SRb are used instead of diodes CRa and CRb of FIGS. 4 and 6. A suitable gate drive technique, as illustrated in FIG. 7, involves coupling the approximate sine wave voltage that appears between the drain terminals of Qa and Qb (i.e., voltage $V_{Qa}-V_{Qb}$) via a transformer T4 to directly drive synchronous rectifiers SRa and SRb in a substantially lossless manner. Alternatively, as illustrated in FIG. 8, the drain voltage of each of the respective switching devices Qa and Qb is coupled via a transformer T5 and T6, respectively, to the gate of the opposite synchronous rectifier SRb and SRa, respectively. For this gate drive technique, blocking capacitors Cb1 and Cb2 are respectively coupled in series with the corresponding switching device Qa and Qb, respectively. The blocking capacitors remove the dc component from the corresponding drain-to-source voltage so that the respective gate transformer incurs only ac losses. As another alternative embodiment, as shown in FIG. 9, the peak positive voltage applied to the synchronous rectifier gates may be reduced by coupling the drain voltage of each respective switching device Qa and Qb to the gate of the corresponding synchronous rectifier SRa and SRb, respectively, resulting in an approximate square wave of forward gate voltage and a corresponding reduction in the average synchronous rectifier voltage drop, i.e., as compared with a sine wave drive.

FIG. 10 graphically illustrates: (a) the drain voltage waveform for switching device Qa; (b) the drain voltage waveform for switching device Qb; and (c) the sine wave voltage $V_{Qa}-V_{Qb}$ that appears between the drain terminals of devices Qa and Qb and is applied to the primary winding of gate transformer T4 of FIG. 7. Furthermore, for comparison, FIGS. 10d, 10e and 10f illustrate the gate voltage for synchronous rectifier SRa for the embodiments of FIGS. 7–9, respectively. In FIGS. 10d–10f, the voltage $V_t$ represents the threshold voltage that must be reached before the device SRa turns on. As indicated, the shaded areas in FIGS. 10e and 10f, respectively, are equal. The on-time for synchronous rectifier SRa is shortest for the circuit configuration of FIG. 8 (FIG. 10e) and longest for the circuit configuration of FIG. 9 (FIG. 10f). Hence, conduction time may be one factor in determining the optimum circuit configuration for a particular application. Moreover, in all three drives (FIGS. 7–9), the energy stored in the input capacitance of a respective synchronous rectifier is not dissipated, but ideally resonantly transferred during each operating cycle to the corresponding main transformer magnetizing inductance, resulting in low synchronous rectifier gate losses.

In general, the power system of the present invention advantageously allows for energy storage on the high-voltage primary side of the power converter without the need for a feedback system having a very high bandwidth to achieve high speed. Instead, high speed in the power system of the present invention is achieved by coupling the energy-storage capacitor directly to the output of the converter, resulting in multiplication of the energy-storage capacitance, as described hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power system for supplying a dc output voltage to a pulsed load, comprising:
   an energy-storage capacitance $C_e$ for coupling to an input dc power source;
   a capacitance-multiplying converter coupled in parallel with said energy-storage capacitance, said capacitance-multiplying converter comprising a series combination of a first switching device and a primary winding of a first transformer coupled in parallel with said energy-storage capacitance and further comprising a series combination of a second switching device and a primary winding of a second transformer coupled in parallel with said energy-storage capacitance, a secondary winding of said first transformer and a secondary winding of said second transformer each being coupled in parallel through separate respective rectifying means to an output filter capacitor, each said rectifying means comprising a synchronous rectifier, said capacitance-multiplying converter further comprising drive means for driving said first and second switching devices at a substantially 50% duty cycle and substantially 180° out-of-phase with respect to each other, said first and second transformer each having substantially the same turns ratio N wherein said first and second switching devices each have power terminals and a control terminal and each said synchronous rectifier has a control terminal; and
   a drive transformer for coupling the voltage between the respective power terminals of said first and second switching devices to the control terminals of each said synchronous rectifier in order to directly drive each said synchronous rectifier in a substantially lossless manner;
   whereby the equivalent output capacitance $C_{eo}$ of said capacitance-multiplying converter is given by the expression:

$$C_{eo}=N^2C_e.$$

2. The power system for supplying a dc output voltage to a pulsed load, comprising:
   an energy-storage capacitance $C_e$ for coupling to an input dc power source;
   a capacitance-multiplying converter coupled in parallel with said energy-storage capacitance, said capacitance-multiplying converter comprising a series combination of a first switching device and a primary winding of a first transformer coupled in parallel with said energy-storage capacitance and further comprising a series combination of a second switching device and a primary winding of a second transformer coupled in parallel with said energy-storage capacitance, a secondary winding of said first transformer and a secondary winding of said second transformer each being coupled in parallel through separate respective rectifying means to an output filter capacitor, each said rectifying means comprising a synchronous rectifier, said capacitance-multiplying converter further comprising drive means for driving said first and second switching devices at a substantially 50% duty cycle and substantially 180° out-of-phase with respect to each other, said first and second transformer each having substantially the same turns ration N wherein said first and second switching devices each have power terminals and a control terminal and each said synchronous rectifier has a control terminal; and
   a series combination of a primary winding of a drive transformer and a blocking capacitor for coupling one of said power terminals of each respective one of said first and second switching devices to the control terminal of the opposite synchronous rectifier in order to directly drive said synchronous rectifier in a substantially lossless manner;

whereby the equivalent output capacitance $C_{eo}$ of said capacitance-multiplying converter is given by the expression:

$$C_{eo} = N^2 C_e.$$

3. A power system for supplying a dc output voltage to a pulsed load, comprising:
an energy-storage capacitance $C_e$ for coupling to an input dc power source;
a capacitance-multiplying converter coupled in parallel with said energy-storage capacitance, said capacitance-multiplying converter comprising a series combination of a first switching device and a primary winding of a first transformer coupled in parallel with said energy-storage capacitance and further comprising a series combination of a second switching device and a primary winding of a second transformer coupled in parallel with said energy-storage capacitance, a secondary winding of said first transformer and a secondary winding of said second transformer each being coupled in parallel through separate respective rectifying means to an output filter capacitor, each said rectifying means comprising a synchronous rectifier, said capacitance-multiplying converter further comprising drive means for driving said first and second switching devices at a substantially 50% duty cycle and substantially 180° out-of-phase with respect to each other, said first and second transformer each having substantially the same turns ratio N wherein said first and second switching devices each have power terminals and a control terminal and each said synchronous rectifier has a control terminal; and
a series combination of a primary winding of a drive transformer and a blocking capacitor for coupling one of said power terminals of each respective one of said first and second switching devices to the control terminal of the corresponding synchronous rectifier in order to directly drive said synchronous rectifier in a substantially lossless manner;
whereby the equivalent output capacitance $C_{eo}$ of said capacitance-multiplying converter is given by the expression:

$$C_{eo} = N^2 C_e.$$

4. A distributed power system for supplying a plurality of distributed pulsed loads, comprising:
an energy-storage capacitance $C_e$ corresponding to each of said distributed pulsed loads for coupling to an input dc power source and for storing substantial energy at high voltage for supplying the respective distributed pulsed load at low voltage; and;
a capacitance-multiplying converter coupled in parallel with each said energy-storage capacitance, each said capacitance-multiplying converter including transformer means for coupling said energy-storage capacitance to the output of the respective capacitance-multiplying converter, each said transformer means having a preselected turns ratio, the equivalent output capacitance of each said capacitance-multiplying converter being substantially equal to the square of said turns ratio multiplied by the respective energy-storage capacitance; and
at least one centralized pre-regulator circuit means, each of said pre-regulator circuit means regulating the voltage across the energy-storage capacitances of a group of said capacitance-multiplying converters, each said pre-regulator circuit means being coupled between the respective energy-storage capacitances of the corresponding capacitance-multiplying converters and said input dc power source.

5. The distributed power system of claim 4 wherein:
each said capacitance-multiplying converter comprises a series combination of a first switching device and a primary winding of a first transformer coupled in parallel with said energy-storage capacitance and further comprises a series combination of a second switching device and a primary winding of a second transformer coupled in parallel with said energy-storage capacitance, a secondary winding of said first transformer and a secondary winding of said second transformer each being coupled in parallel through separate respective rectifying means to an output filter capacitor, each said capacitance-multiplying converter further comprising drive means for driving said first and second switching devices at a substantially 50% duty cycle and substantially 180° out-of-phase with respect to each other, said first and second transformer each having substantially the same turns ratio N wherein said first and second switching devices each have power terminals and a control terminal.

6. The distributed power system of claim 5 wherein said first and second transformers each have negligible leakage inductance.

7. The distributed power system of claim 5 wherein said rectifying means each comprises a diode.

8. The distributed power system of claim 5 wherein said rectifying means each comprises a synchronous rectifier having a control terminal.

9. The power system of claim 8, further comprising a drive transformer for coupling the voltage between the respective power terminals of said first and second switching devices to the control terminals of said synchronous rectifier in order to directly drive each said synchronous rectifier in a substantially lossless manner.

10. The power system of claim 8, further comprising a series combination of a primary winding of a drive transformer and a blocking capacitor for coupling one of said power terminals of each respective one of said first and second switching devices to the control terminal of the opposite synchronous rectifier in order to directly drive said synchronous rectifier in a substantially lossless manner.

11. The power system of claim 8, further comprising a series combination of a primary winding of a drive transformer and a blocking capacitor for coupling one of said power terminals of each respective one of said first and second switching devices to the control terminal of the corresponding synchronous rectifier in order to directly drive said synchronous rectifier in a substantially lossless manner.

* * * * *